US009630161B2

(12) United States Patent
Hohman et al.

(10) Patent No.: US 9,630,161 B2
(45) Date of Patent: Apr. 25, 2017

(54) METAL ALLOY NANOPARTICLE SYNTHESIS VIA SELF-ASSEMBLED MONOLAYER FORMATION AND ULTRASOUND

(71) Applicant: The Regents of the University of California, Oakland, CA (US)

(72) Inventors: James Nathan Hohman, Los Angeles, CA (US); Paul S. Weiss, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 396 days.

(21) Appl. No.: 13/801,349

(22) Filed: Mar. 13, 2013

(65) Prior Publication Data

US 2013/0244037 A1    Sep. 19, 2013

Related U.S. Application Data

(60) Provisional application No. 61/611,343, filed on Mar. 15, 2012.

(51) Int. Cl.
*B01J 8/16* (2006.01)
*B82Y 30/00* (2011.01)
*B22F 9/08* (2006.01)
*C22C 1/04* (2006.01)

(52) U.S. Cl.
CPC .............. *B01J 8/16* (2013.01); *B22F 9/082* (2013.01); *B82Y 30/00* (2013.01); *C22C 1/0491* (2013.01); *B22F 2999/00* (2013.01); *Y10T 428/2984* (2015.01)

(58) Field of Classification Search
None
See application file for complete search history.

(56) References Cited

U.S. PATENT DOCUMENTS

| 7,601,406 B2 * | 10/2009 | Garbar et al. ................. 428/1.4 |
| 2009/0233086 A1 * | 9/2009 | Hirai ............................. 428/328 |
| 2010/0255311 A1 * | 10/2010 | Lee et al. ...................... 428/403 |
| 2011/0151586 A1 * | 6/2011 | Chen .................... B22F 1/0062 436/531 |

(Continued)

OTHER PUBLICATIONS

Hohman et al., Directing Substrate Morphology via Self-Assembly: Ligand-Mediated Scission of Gallium-Indium Microspheres to the Nanoscale, ACS Publications, Oct. 14, 2011, pp. 5104-5110.*

(Continued)

*Primary Examiner* — Jeffrey Washville
(74) *Attorney, Agent, or Firm* — KPPB LLP

(57) ABSTRACT

Methods and assemblies for the construction of liquid-phase alloy nanoparticles are presented. Particle formation is directed by molecular self-assembly and assisted by sonication. In some embodiments, eutectic gallium-indium (EGaIn) nanoparticles are formed. In these embodiments, the bulk liquid alloy is ultrasonically dispersed, fast thiolate self-assembly at the EGaIn interface protects the material against oxidation. The assembly shell has been designed to include intermolecular hydrogen bonds, which induce surface strain, assisting in cleavage of the alloy particles to the nanoscale. X-ray diffraction and TEM analyses reveal that the nanoscale particles are in an amorphous or liquid phase, with no observed faceting.

14 Claims, 9 Drawing Sheets

(56) References Cited

U.S. PATENT DOCUMENTS

2012/0067615 A1* 3/2012 Blaiszik et al. .......... 174/110 R

OTHER PUBLICATIONS

Bang et al., "Applications of Ultrasound to the Synthesis of Nanostructured Materials", Advanced Materials, 2010, vol. 22, pp. 1039-1059.
Chen et al., "Composition Effects of FePt Alloy Nanoparticles on the Electro-Oxidation of Formic Acid", Langmuir, 2007, vol. 23, pp. 11303-11310.
Chen et al., "Effect of Ultrasound on Chemical Reaction Rate", I&EC Fundamentals, May 1967, vol. 6, No. 2, pp. 175-178.
Chiechi et al., "Eutectic Gallium-Indium (EGaIn): A Moldable Liquid Metal for Electrical Characterization of Self-Assembled Monolayers", Angew. Chem. Int. Ed., 2008, vol. 47, pp. 142-144.
Claridge et al., "Cluster-Assembled Materials", ACS NANO, 2009, vol. 3, No. 2, pp. 244-255.
Clegg et al., "Control of Monolayer Assembly Structure by Hydrogen Bonding Rather Than by Adsorbate-Substrate Templating", J. Am. Chem. Cos., 1999, vol. 121, pp. 5319-5327.
Clegg et al., "Hydrogen-Bonding, Self-Assembled Monolayers: Ordered Molecular Films for Study fo Through-Peptide Electron Transfer", Langmuir, 1996, vol. 12, No. 22, pp. 5239-5243.
Daniel et al., "Gold Nanoparticles: Assembly, Supramolecular Chemistry, Quantum-Size-Related Properties, and Applications Toward Biology, Catalysis, and Nanotechnology", Chem. Rev., 2004, vol. 104, pp. 293-346.
Ghorai et al., "Molecular Dynamics Simulation Study of Self-Assembled Monolayers of Alkanethiol Surfactants on Spherical Gold Nanoparticles", J. Phys. Chem., C 2007, vol. 111, pp. 15857-15862.
Ghosh et al., "Solvent and Ligand Effects on the Localized Surface Plasmon Resonance (LSPR) of Gold Colloids", J. Phys. Chem. B, 2004, vol. 108, pp. 13963-13974.
Hohman et al., "Cage molecules for self-assembly", Materials Science and Engineering, 2010, vol. R70, pp. 188-208.
Hu et al., "Chemistry and Physics in One Dimension: Synthesis and Properties of Nanowires and Nanotubes", Acc. Chem. Res., 1999, vol. 32, pp. 435-445.
Jackson et al., "Spontaneous assembly of subnanometre-ordered domains in the ligand shell of monolayer-protected nanoparticles", Nature materials, May 2004, vol. 3, pp. 330-336.
Jin et al., "Photoinduced Conversion of Silver Nanospheres to Nanoprisms", Science, Nov. 30, 2001, vol. 294, pp. 1901-1903.
Kalimuthu et al., "Studies on ligand exchange reaction on functionalized mercaptothiadiazole compounds onto citrate capped gold nanoparticles", Materials Chemistry and Physics, 2010, vol. 122, pp. 380-385.
Larsen et al., "Viscoelastic properties of oxide-coated liquid metals", J. Rheol., Nov./Dec. 2009, vol. 53, No. 6, pp. 1305-1326.
Leff et al., "Synthesis and Characterization of Hydrophobic Organically-Soluable Gold Nanocrystals Functionalized with Primary Amines", Langmuir, 1996, vol. 12, pp. 4723-4730.
Lewis et al., "Molecular engineering of the Polarity and Interactions of Molecular Electronic Switches", J. Am. Chem. Soc., 2005, vol. 127, pp. 17421-17426.
Lewis et al., "The Role of Buried Hydrogen Bonds in Self-Assembled Mixed Composition Thiols on Au{111}", J. Phys. Chem. B, 2001, vol. 105, pp. 10630-10636.
Liu et al., "Monodisperse Gold-Copper Bimetallic Nanocubes: Facile One-Step Synthesis with Controllable Size and Composition", Angew. Chem. Int. Ed., 2010, vol. 49, pp. 6781-6785.
Love et al., "Self-Assembled Monolayers of Thiolates on Metals as a Form of Nanotechnology", Chem. Rev., 2005, vol. 105, pp. 1103-1169.
McGuiness et al., "Molecular Self-Assembly at Bare Semiconductor Surfaces: Characterization of a Homologous Series of n-Alkanethiolate Monolayers on GaAs(001)", ACSNANO, 2007, vol. 1, No. 1, pp. 30-49.
Melendrez et al., "Synthesis and characterization of gallium colloidal nanoparticles", Journal of Colloid and Interface Science, 2010, vol. 346, pp. 279-287.
Murray et al., "Synthesis and Characterization of Monodisperse Nanocrystals and Close-Packed Nanocrystal Assemblies", Annu. Rev. Mater. Sci., 2000, vol. 30, pp. 545-610.
Pokroy et al., "Sonication-Assisted Synthesis of Large, High-Quality Mercury Thiolate Single Crystals Directly from Liquid Mercury", J. Am. Chem. Soc., 2010, vol. 132, pp. 14355-14357.
Raabe et al., "Synthesis of hollow metallic particles via ultrasonic treatment of a metal emulsion", Scripta Materialia, 2010, vol. 62, pp. 690-692.
Rice et al., "Solvent-Dependent Surface Plasmon Response and Oxidation of Copper Nanocrystals", J. Phys. Chem. C, 2011, pp. 115, pp. 1793-1799.
Schvartzman et al., "Passivation of InP surfaces of electronic devices by organothiolated self-assembled monolayers", J. Vac. Sci. Technol. B, Jan./Feb. 2003, vol. 32, No. 1, pp. 148-155.
Siegel et al., "Microsolidics: Fabrication of Three-Dimensional Metallic Microstructures in Poly(dimethylsiloxane)", Adv. Mater. 2007, vol. 19, pp. 727-733.
Smith et al., "Phase Separation within a Binary Self-Assembled Monolayer on Au{111} Driven by an Amide-Containing Alkanethiol", J. Phys. Chem. B, 2001, vol. 105, pp. 1119-1122.
Suslick, "Sonochemistry", Articles, Mar. 23, 1990, pp. 1439-1445.
Tam-Chang et al., "Self-Assembled Monlayers on Gold Generated from Alkanethiols with the Structure $RNHCOCH_2SH$", Langmuir, 1995, vol. 11, pp. 4371-4382.
Templeton et al., "Monolayer-Protected Cluster Molecules", Acc. Chem. Res., 2003, vol. 33, pp. 27-36.
Wanjala et al., "Nanoscale Alloying, Phase-Segregation, and Core-Shell Evolution of Gold-Platinum Nanoparticles and Their Electrocatalytic Effect on Oxygen Reduction Reaction", Chem. Mater., 2010, vol. 22, pp. 4282-4294.
Wender, "Look through a molecular lens", Nature, Jan. 6, 2011, vol. 469, pp. 23-25.
Wu et al., "Plasmonic Gallium Nanoparticles on Polar Semiconductors: Interplay between Nanoparticle Wetting, Localzed Surface Plasmon Dynamics, and Interface Charge", Langmuir, 2009, vol. 25, pp. 924-930.
Xia et al., "One-Dimensional Nanostrructures: Synthesis, Characterization, and Applications", Adv. Mater., Mar. 4, 2003, vol. 15, No. 5, pp. 353-389.
Yan et al., "Preparation and Characterization of Self-Assembled Monolayers on Indium Tin Oxide", Langmuir, 2000, vol. 16, pp. 6208-6215.
Yu et al., "Platinum Concave Nanocubes with High-Index Facets and Their Enhanced Activity for Oxygen Reduction Reaction", Angew. Chem. Int. Ed., 2011, vol. 50, pp. 2773-2777.

* cited by examiner

METAL ALLOY NANOPARTICLE SYNTHESIS VIA SELF-ASSEMBLED MONOLAYER FORMATION AND ULTRASOUND

CROSS-REFERENCE TO RELATED APPLICATIONS

This application claims priority to U.S. Provisional Application No. 61/611,343, filed Mar. 15, 2012, the disclosure of which is incorporated herein by reference.

STATEMENT OF GOVERNMENT SUPPORT

This invention was made with Government support under Grant Number 1013042, awarded by the National Science Foundation. The Government has certain rights in the invention.

FIELD OF THE INVENTION

Methods for the construction of liquid-phase alloy nanoparticles by molecular self-assembly, and self-assembled alloy nanoparticles are presented.

BACKGROUND OF THE INVENTION

Metallic nanoparticles are useful for a wide-variety of applications and have generated a great deal of scientific interest, because they effectively a bridge between bulk materials and atomic or molecular structures. Standard metallic nanoparticle synthetic approaches exploit controlled reduction from a homogenous reagent solution; control over reaction conditions yields excellent uniformity of particle size and shape. (See, e.g., C. B. Murray, et al., *Annu. Rev. Mater. Sci.* 30, 545 (2000); J. Hu, et al., *Acc. Chem. Res.* 32, 435 (1999); Y. N. Xia, *Adv. Mater.* 15, 353 (2003); Y. Liu and A. R. H. Walker, *Angew. Chem., Int. Ed.* 49, 6781 (2010); T. Yu, et al., *Angew. Chem., Int. Ed.* 50, 2773 (2011); R. Jin et al., *Science* 294, 1901 (2001); A. C. Templeton, et al., *Acc. Chem. Res.* 33, 27 (2000); A. M. Jackson, et al., *Nat. Mater.* 3, 330 (2004); D. V. Leff, et al., *Langmuir* 12, 4723 (1996); M. C. Daniel and D. Astruc, *Chem. Rev.* 104, 293 (2004); and S. A. Claridge et al., *ACS Nano* 3, 244 (2009), the disclosures of each of which are incorporated herein by reference.) However, alloy nanoparticle synthesis is considerably more challenging. Synthetic approaches include co-reduction and organometallic chemistry; particles are generally bimetallic, many elements are incompatible, and there are limitations of composition range and product uniformity. (See, e.g., W. Chen, et al., *Langmuir* 23, 11303 (2007); and B. N. Wanjala et al., *Chem. Mater.* 22, 4282 (2010), the disclosures of which are incorporated herein by reference.)

SUMMARY OF THE INVENTION

In many embodiments, the invention is directed to a method of forming liquid-phase metal alloy nanoparticles including:
  providing a liquid phase metal alloy material having at least two alloying components;
  placing the liquid phase metal alloy into solution with an organic self-assembly molecule, the self-assembly molecule exerting an intermolecule force with adjacent self-assembly molecules;
  dispersing the liquid phase metal alloy through the solution by application of ultrasonic treatment such that self-assembly molecules adsorb with the liquid phase metal alloy; and
  assembling the liquid phase metal alloy via self-assembly of the self-assembly molecules such that nanoparticles of liquid phase metal alloy having at least a partial monolayer shell of self-assembly molecules disposed thereon are formed.

In some embodiments, the method includes ultrasonically treating the nanoparticles to further reduce the size of the nanoparticles.

In other embodiments, an outer surface of the liquid phase metal alloy is passivated. In some such embodiments, the passivation comprises oxidizing the outer surface of the alloy material.

In still other embodiments, the liquid phase metal alloy is an EGaIn material. In some such embodiments, the EGaIn material is further doped with at least one additional alloying material. In some such embodiments, the at least one additional alloying material is selected from the group consisting of the noble metals, arsenic, iron, copper, chrome and combinations thereof. In still other such embodiments, the at least one additional alloying material is a photoactive material.

In yet other embodiments, the intermolecular force induces a strain on the alloy nanoparticles. In some such embodiments, the self-assembly molecule exerts a hydrogen-bonding intermolecular force.

In still yet other embodiments, the self-assembly molecule is a thiol.

In still yet other embodiments, the self-assembly molecule is 3-mercapto-N-propionamide.

In still yet other embodiments, the method further includes purifying the nanoparticles via centrifugation.

In still yet other embodiments, the nanoparticles are spheroids.

In many other embodiments, the invention is directed to self-assembled liquid-phase metal alloy nanoparticles including a liquid phase metal alloy core comprised of at least two alloying components and an organic self-assembly molecule outer shell disposed thereon, wherein the self-assembly molecule exerts an intermolecule force with adjacent self-assembly molecules.

In some embodiments, an outer surface of the liquid phase metal alloy includes a passivation layer. In some such embodiments, the passivation layer is an oxide.

In other embodiments, the liquid phase metal alloy is an EGaIn material. In some such embodiments, the EGaIn material is further doped with at least one additional alloying material. In other such embodiments, the at least one additional alloying material is selected from the group consisting of the noble metals, arsenic, iron, copper, chrome and combinations thereof. In still other such embodiments, the at least one additional alloying material is a photoactive material.

In still other embodiments, the intermolecular force induces a strain on the alloy nanoparticles. In some such embodiments, the self-assembly molecule exerts a hydrogen-bonding intermolecular force.

In yet other embodiments, the self-assembly molecule is a thiol.

In still yet other embodiments, the self-assembly molecule is 3-mercapto-N-propionamide.

In still yet other embodiments, the nanoparticles are spheroids.

BRIEF DESCRIPTION OF THE DRAWINGS

The description will be more fully understood with reference to the following figures and data graphs, which are presented as exemplary embodiments of the invention and should not be construed as a complete recitation of the scope of the invention, wherein.

DETAILED DESCRIPTION OF THE INVENTION

Figure 1:
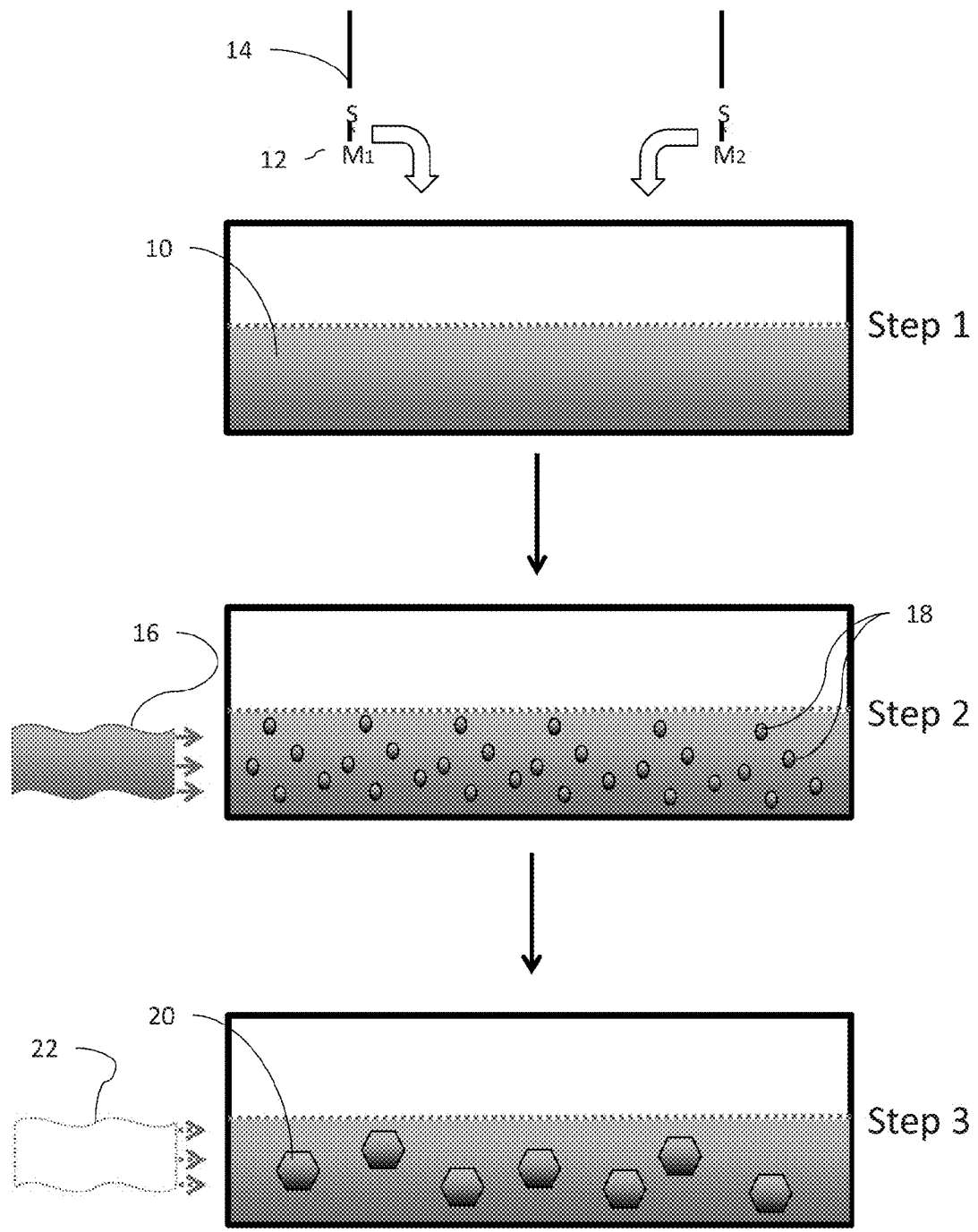
FIG. 1 illustrates a schematic of a method for self-assembly monolayer formation of ultrasonically dispersed liquid-phase metal alloy nanoparticles in accordance with embodiments.

Turning now to the drawings, systems and methods for the facile self-assembly monolayer formation of ultrasonically dispersed liquid-phase metal alloy nanoparticles are described. Self-assembly has unmatched potential as a universal design principle for the development of new materials and technologies. (See, e.g. P. Wender et al., Nature 469, 23 (2011), the disclosure of which is incorporated herein by reference.) One example of useful self-assembly is the fast, spontaneous formation of self-assembled monolayers (SAMs) of amphiphilic molecules on bulk and nanoparticle surfaces has used to exert interfacial control. The molecules or ligands for such applications typically possess a surface anchoring functionality, such as sulfur with its high affinity for noble metals, at one end, and any other moiety of interest at the other end of any desired linker and can be chosen to produce specific chemical, physical, or mechanical properties in the formed surfaces. (See, e.g., J. C. Love, et al., Chem. Rev. 105, 1103 (2005), the disclosure of which is incorporated herein by reference.) A SAM's morphology is usually dominated by the substrate morphology. However, if a liquid substrate is chosen, molecular assembly at the liquid surface can simultaneously control interfacial chemistry, limit corrosion, and control substrate morphology with the aggregate sum of 'weak' intermolecular forces. (See, e.g., B. Pokroy et al., J. Am. Chem. Soc. 132, 14355 (2010), the disclosure of which is incorporated herein by reference.)

Although self-assembly and ultrasonication have been employed, current techniques have been limited in the types of nanoparticles to which these techniques have been applied. For example, the local extremes of temperature and pressure induced by ultrasound have been shown to be effective in dispersing materials, producing categories of nanomaterials. (See, e.g., J. H. Bang and K. S. Suslick, Adv. Mater. 22, 1039 (2011); and K. S. Suslick, Science 247, 1439 (1990), the disclosures of which are incorporated herein by reference.) Raabe et al. used ultrasonic cavitation in an emulsion of water and molten Field's metal (32.5% Bi, 51% In, and 16.5% Sn by weight) to produce micro- and nanoparticles of a complex alloy with a continuous size distribution. (See, e.g., D. Raabe and D. Hessling, Scr. Mater. 62, 690 (2010), the disclosure of which is incorporated herein by reference.) Finally, Aizenberg and coworkers demonstrated that intermolecular interactions between alkanethiolate adsorbates on ultrasonically dispersed mercury produces planar, microscale mercury thiolate crystals. However, ultrasonic self-assembly and ultrasonication techniques applicable to the controllable formation of alloy nanoparticles remains elusive. Accordingly available approaches for alloy nanoparticles mainly include co-reduction and organometallic chemistry; particles are generally bimetallic, many elements are incompatible, and there are limitations of composition range and product uniformity.

In embodiments a method and supramolecular assemblies for the structural control of liquid-metal alloys, and for the controllable disassembly of these alloys into nanoparticles over a wide size range and with compositional control are described. In many embodiments, alloy nanoparticle formation is directed by a controlled combination of molecular self-assembly and sonication. For instance, as shown in FIG. 1, in some embodiments the method includes: preparing a solution of alloying metals (10) having an outer shell of self-assembly ligand molecules (12) capable of inducing a surface strain on an assembled nanoparticle in a suitable reagent (14) (Step 1), ultrasonically (16) dispersing the solution of self-assembly molecule/bulk liquid metal alloy moieties (1S) (Step 2), and allowing for the interaction of the self-assembly ligand molecules to assemble the liquid metal alloy in nanoparticles (20) and optional further sonicating (22) the assembled nanoparticles to disassemble the nanoparticles into nanoparticles of reduced size (Step 3).

Selection of Liquid Alloy Material

In many embodiments, the alloy material is a combination of metallic alloying elements having low melting temperatures that are compatible with solution reagents, and particularly organic reagents such as ethanol. Because the alloys are in solution, in many embodiments the composition of the alloy may be adjusted by mixing desired ratios of the alloy materials into solution prior to or during dispersal by sonication. In some embodiments the method for the construction of liquid-phase alloy nanoparticles is used to form liquid-phase eutectic gallium-indium (EGaIn) alloy nanoparticles. A confluence of mechanical and chemical characteristics enables the facile preparation of EGaIn nanomaterials. Gallium alloys with, and can be doped by, many of the elements on the periodic table while retaining low melting points. As a result, by incorporating other metal and alloying materials with gallium it is possible to design a large variety of alloys and doped alloys to tune the chemical and electronic characteristics of the alloy nanoparticle materials.

Although gallium is a technologically important material, nanoscale synthetic routes have generally been limited to molecular beam epitaxy and chemical liquid deposition. (See, e.g., M. F. Melendrez and G. Cardenas, J. Arbiol, *J. Colloid Interface Sci.* 346, 279 (2010); and P. C. Wu et al., *Langmuir* 25, 924 (2008), the disclosures of which are incorporated herein by reference.) Self-assembled monolayers have been previously reported on gallium- and indium-containing materials, but have not heretofore been reported directly on gallium, indium, or their alloys (although thiol termination has been shown to improve EGaIn wetting in microchannels). (See, e.g., C. Yan, et al., *Langmuir* 16, 6208 (2000); C. L. McGuiness et al., *ACS Nano* 1, 30 (2007); M. Schvartzman, et al., *J. Vac. Sci. Technol., B* 21, 148 (2003); and A. C. Siegel, et al., *Adv. Mater.* 19, 727 (2007), the disclosures of which are incorporated herein by reference.) An ultrasound-assisted and SAM-directed approach thus provides the opportunity to prepare diverse gallium-based alloys at the micro- and nanoscale.

Although EGaIn alloy nanoparticles are discussed above, it should be understood that other combinations of alloying materials, either in association with the EGaIn liquid alloy or not, may be used. For example, it is contemplated that embodiments of nanoparticles that incorporate other metal alloys such as, for example, arsenic, iron, copper, and chrome alloys may be similarly formed. Additionally, in some embodiments the nanoparticles might incorporate active molecules such as, for example, photoactive molecules in the monolayer. For example, in some embodiments doped nanoparticles based on EGaIn, and more specifically gold-doped EGaIn (0.1% by wt) have been developed, and will be described in detail in the following sections.

Regardless of the liquid metal alloy material used, in many embodiments the surface of the liquid metal alloy may be passivated to encourage dispersal of the alloy by the sonication process and the formation and disassembly of nanoparticles. The passivation may take the form, for example, of a protective coating, such as an oxide coating, which may be disposed on the liquid metal alloy. For example, the EGaIn alloy itself is a well-known non-Newtonian fluid, a characteristic that under most circumstances is imbued by the formation of an oxide 'skin' on its surface. (See, e.g., R. C. Chiechi, et al., *Angew. Chem., Int. Ed.* 47, 142 (2008); and R. J. Larsen, et al., *J. Rheol.* 53, 1305 (2009), the disclosures of which are incorporated herein by reference.) The presence of the passivating layer assists in the synthesis of EGaIn nanoparticles, because the passivating oxide layer, as oxygen and thiol, would compete for surface sites and interfere with the assembly of thiols at the interface. The oxide or other passivating shell relaxes the alloy surface, such that the oscillating shear forces in the ultrasonic bath can fragment and disperse the alloy. In the absence of this oxide skin (for example, in an oxygen-free environment or in the presence of aqueous halide acids), EGaIn would behave similarly to mercury, and pull into a tight sphere because of its high surface energy. (See, R. J. Larsen, et al., (2009) cited above.) In short, for some liquid metal alloys with high surface energy it would not be possible to disperse the alloy to form nanoparticles by ultrasound without the surface oxide or an equivalent passivating layer.

Selection of SAM Reactants

Figure 2:
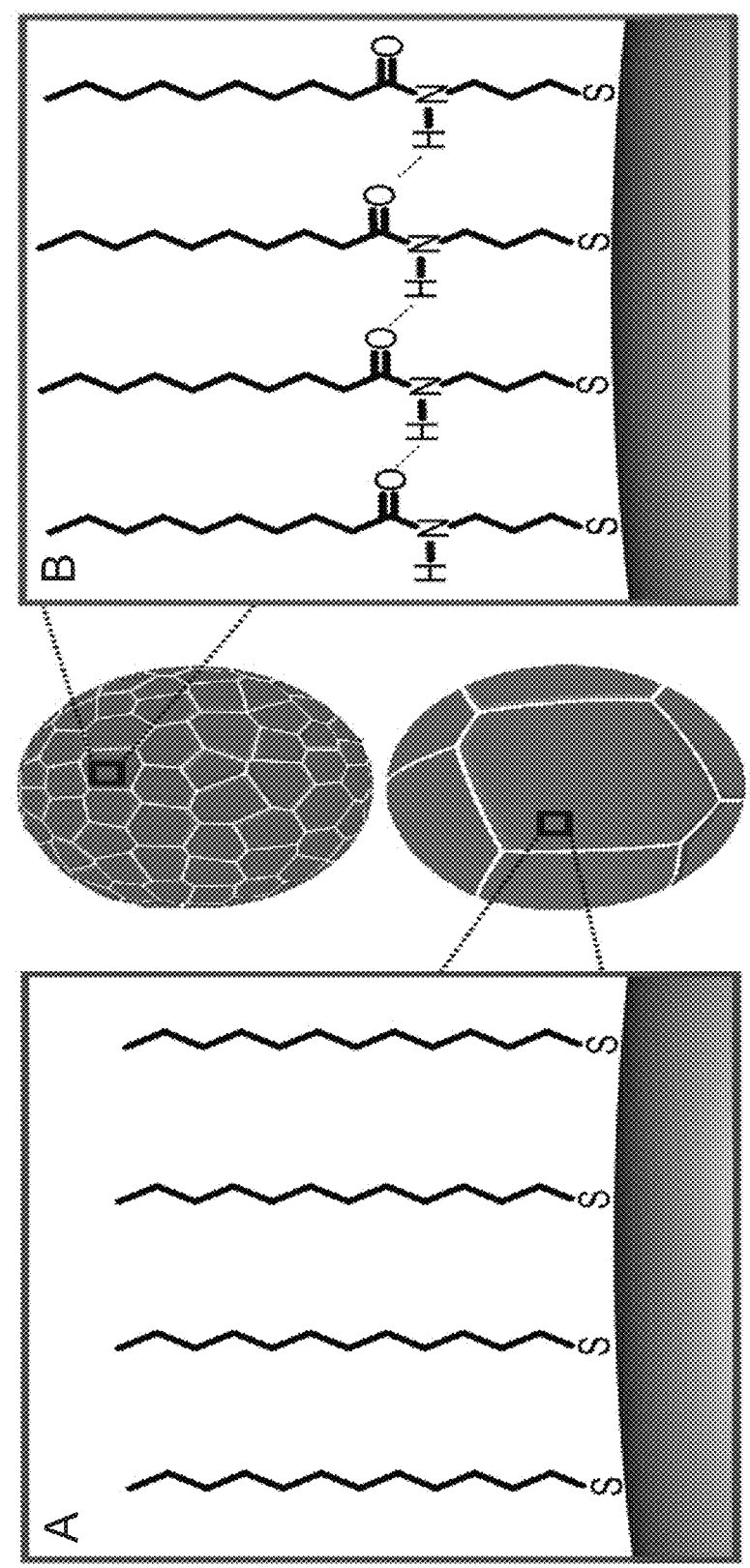
FIG. 2 illustrates a schematic representation of molecular-scale interactions within SAMs on EGaIn nanoparticles, where: A) a C12 SAM passivates the EGaIn interface, forming few domains, and B) hydrogen-bonding within 1ATC9 SAMs dominates local order and decreases domain size, despite similar overall ligand coverage.
Figure 7:
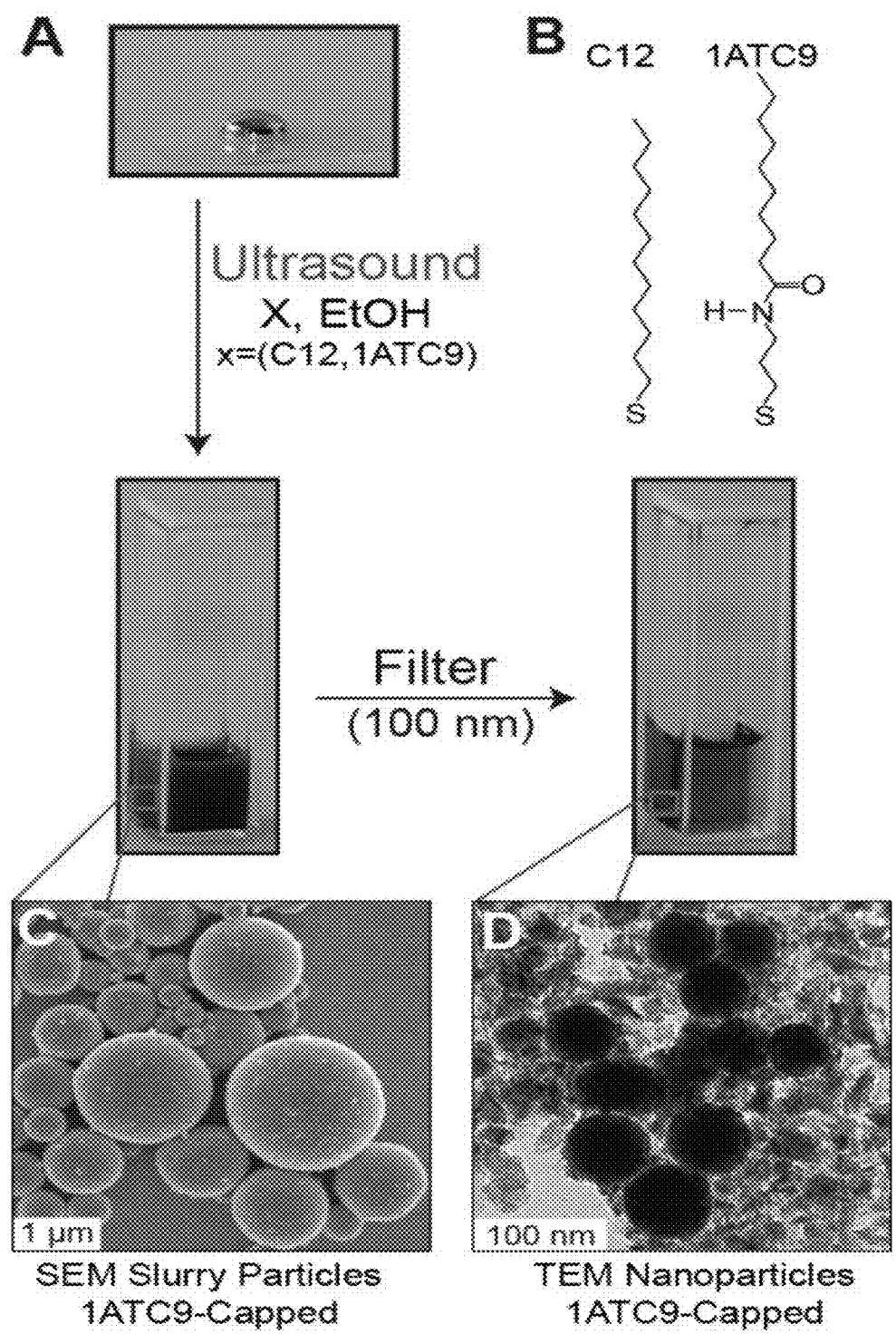
FIGS. 7A to 7D illustrate: A) Eutectic gallium-indium alloy ultrasonically dispersed in an ethanolic solution of B) 1ATC9 or C12, and characterized by C) and D) TEM in accordance with embodiments.
Figure 8:
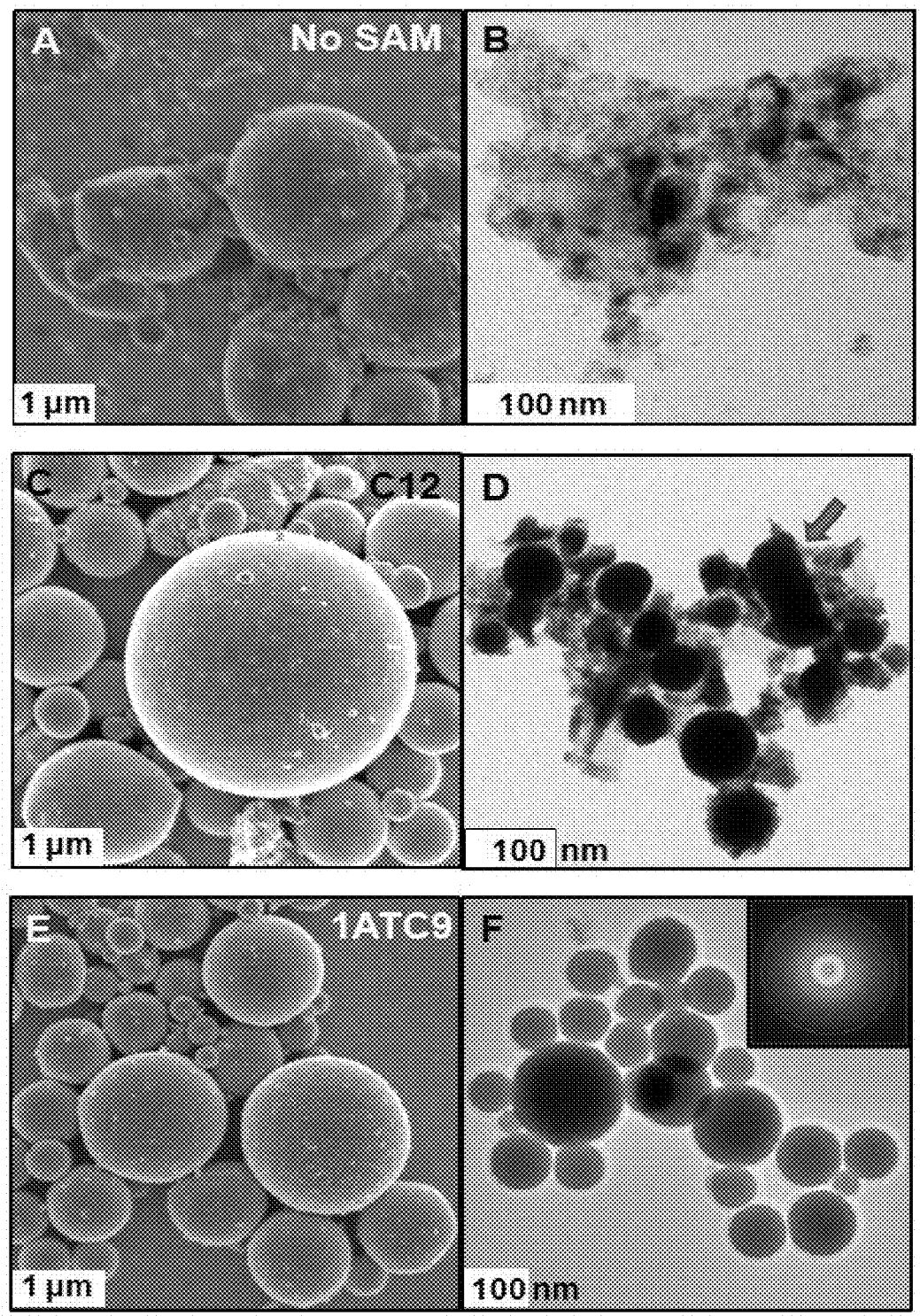
FIGS. 8A to 8F provide images of eutectic gallium-indium liquid alloy microscale and nanoparticles in accordance with embodiments imaged by SEM and TEM, where: EGaIn is dispersed in A and B) ethanol, C and D) C12 (C12NP), and E and F) 1ATC9 (1ATC9NP).

In conventional SAM the structure of the SAM is defined by the substrate shape, the nature of the ligand\substrate interaction, and the geometry of and intermolecular forces between adsorbates. (See, e.g., J. N. Hohman, et al., *Mater. Sci. Eng.*, R 70, 188 (2010); and P. K. Ghorai & S.C. Glatzer, *J. Phys. Chem.* C 111, 15857 (2007), the disclosure of which is incorporated herein by reference.) In liquid phase SAM, the shape of the substrate (the size and shape of the nanoparticle formed through SAM) is dominated by the molecule\substrate interaction and the geometry of and intermolecular forces between adsorbates. To demonstrate the effect of ligand properties on the formation of the liquid metal nanoparticles, the spontaneous formation of SAMs on ultrasonically dispersed eutectic gallium-indium (EGaIn) alloy (74.5% Ga, 24.5% In by weight) was investigated. The results are illustrated in FIGS. 7 and 8 (discussed in greater detail below). In the embodiments studied two SAM-forming thiol ligands were used: 1-dodecanethiol (C12) and 3-mercapto-N-propionamide (1ATC9), shown schematically in FIG. 7B, as well as FIG. 2. As shown, in a typical metal SAM ligand fashion, both of the ligands have sulfur (thiol) moiety—a functional group covalently reactive with the liquid phase metal alloy—at one end. In addition, both ligands have one or more functional groups at their other end (i.e. hydrophobic alkyl chain and alkyl amide functionality) that are capable of exerting intermolecular bonding interaction with adjacent self-assembly molecules (van der Waals forces and hydrogen bonding, correspondingly). The results show that though both 1ATC9NP and C12NP have similar general morphologies their use in forming nanoparticles in the system result in different relative yields. In particular, the 1ATC9NPs produce a large fraction of spherical nanoparticles, while the C12NPs are predominantly irregular (see Exemplary Embodiment, below).

Although not to be bound by theory, it is believed that the reason for this difference in nanoparticle formation lies in the intermolecular interactions generated by the different ligands. Thiol SAM interactions on gold can be used for insight into the structure of SAMs on liquid metal alloys such as gallium-indium nanoparticles. For example, molecular dynamics simulations for alkanethiolate ligand shells on spherical gold nanoparticles reveal a tendency to form few, and large domains at room temperature. (See, P. K. Ghorai & S. C. Glatzer, (2007), cited above.) It is the emergence of these domains (shown schematically in FIG. 2) that protects C12NPs from scission. Monolayers of C12 on gold are known for a high degree of nanoscale order stabilized by van der Waals forces; these weak interactions effectively passivate the alloy surface, which in the liquid metal alloys of the embodiment both enable and limit EGaIn nanoparticle formation. (See, e.g., J. C. Love, et al., *Chem. Rev.* 105, 1103 (2005), the disclosure of which is incorporated herein by reference.) In contrast, the secondary amide group in 1ATC9 monolayers results in directional, intermolecular hydrogen bonds within the films, dominating the local SAM structure. (See, e.g., R. S. Clegg & J. E. Hutchison, *J. Am. Chem. Soc.* 121, 5319 (1999), the disclosure of which is incorporated herein by reference.) Explicitly, while the first end of each of the self-assembly 1ATC9 molecule is covalently bound (anchored) to the outer surface of the nanoparticle via the thiol functionality, the second end extends outward from the nanoparticle and interacts with the second ends of adjacent self-assembly molecules in the monolayer shell through the directional intermolecular hydrogen bonding interactions of secondary amide groups. These local interactions tend to outcompete longer range interactions, producing more (and smaller) domains (see FIG. 2) and leaving the particles more susceptible to calving by sonication. As a secondary effect, smaller domains on larger particles imply a higher defect density. Oxidation at defects alters the mechanical properties of the alloy, so partially oxidized particles are expected to divide rapidly during sonication, thus allowing for the ultrasound-assisted scission of EGaIn particles to the nanoscale. (See, e.g., R. K. Smith, J. Phys. Chem. B 105, 1119 (2001); P. A. Lewis et al., J. Phys. Chem. B 105, 10630 (2001); P. A. Lewis et al., J. Am. Chem. Soc. 127, 17421 (2005); S.-W. Tam-Chang, et al., Langmuir 11, 4371 (1995); and R. S. Clegg, J. E. Hutchison, Langmuir 12, 5239 (1996), the disclosures of which are incorporated herein by reference.)

These results and accompanying analysis indicates that ligand choice plays an important role in determining the properties of nanoparticle formation. In particular, the combination of strong intermolecular interactions between SAM molecules and local order facilitates the nondestructive scission of larger spherical particles into smaller nanoparticles. Accordingly, in many embodiments the self-assembly ligand molecule to be associated with the liquid metal alloy material is a molecule designed to exert an intermolecular interaction capable of both ordering and inducing surface strain in the alloy particles. Examples of suitable interactions include, but are not limited to, hydrogen bonding interactions (such as those between carboxylic acid groups), coordination chemistry (between metals and nonmetal functional groups, or direct covalent bonding, for example, azide-alkyne Huisgen cycloaddition between an azide and alkyne functional group. Such induced strain assists in the cleavage of alloy particles to the nanoscale, in many embodiments under the influence of sonication forces. In some such embodiments, strain inducing molecules include thiolate molecules, such as ethanolic 1ATC9, although other suitable strain inducing molecules may be used.

Sonication Conditions

Figure 3:
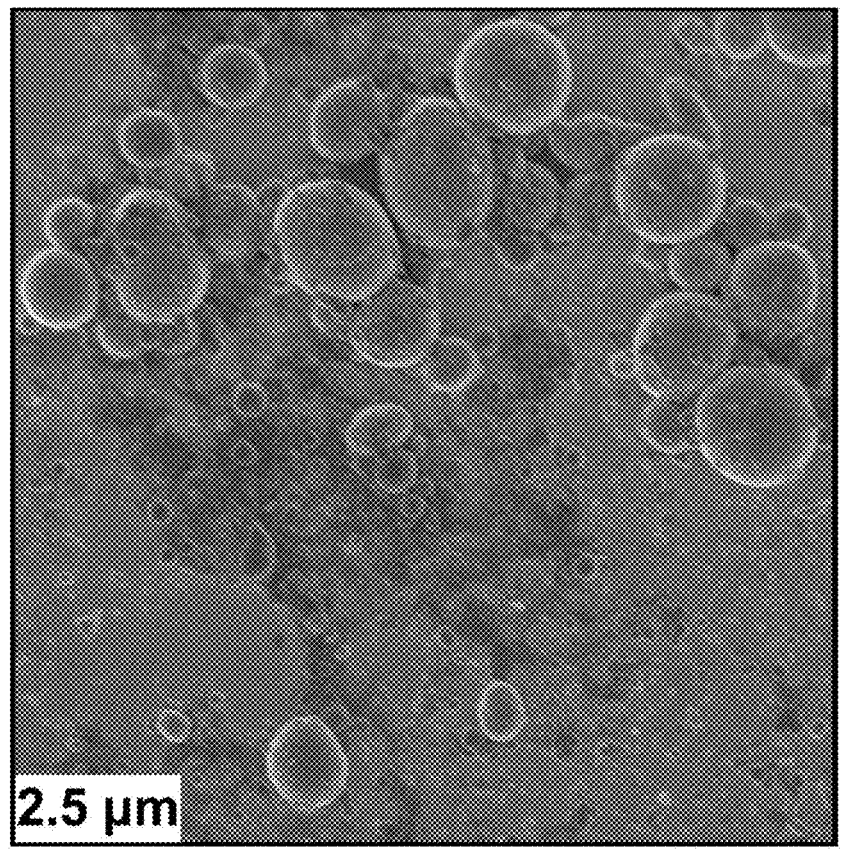
FIG. 3 provides a scanning electron micrograph of sonicated EGaIn in ethanol.
Figure 4:
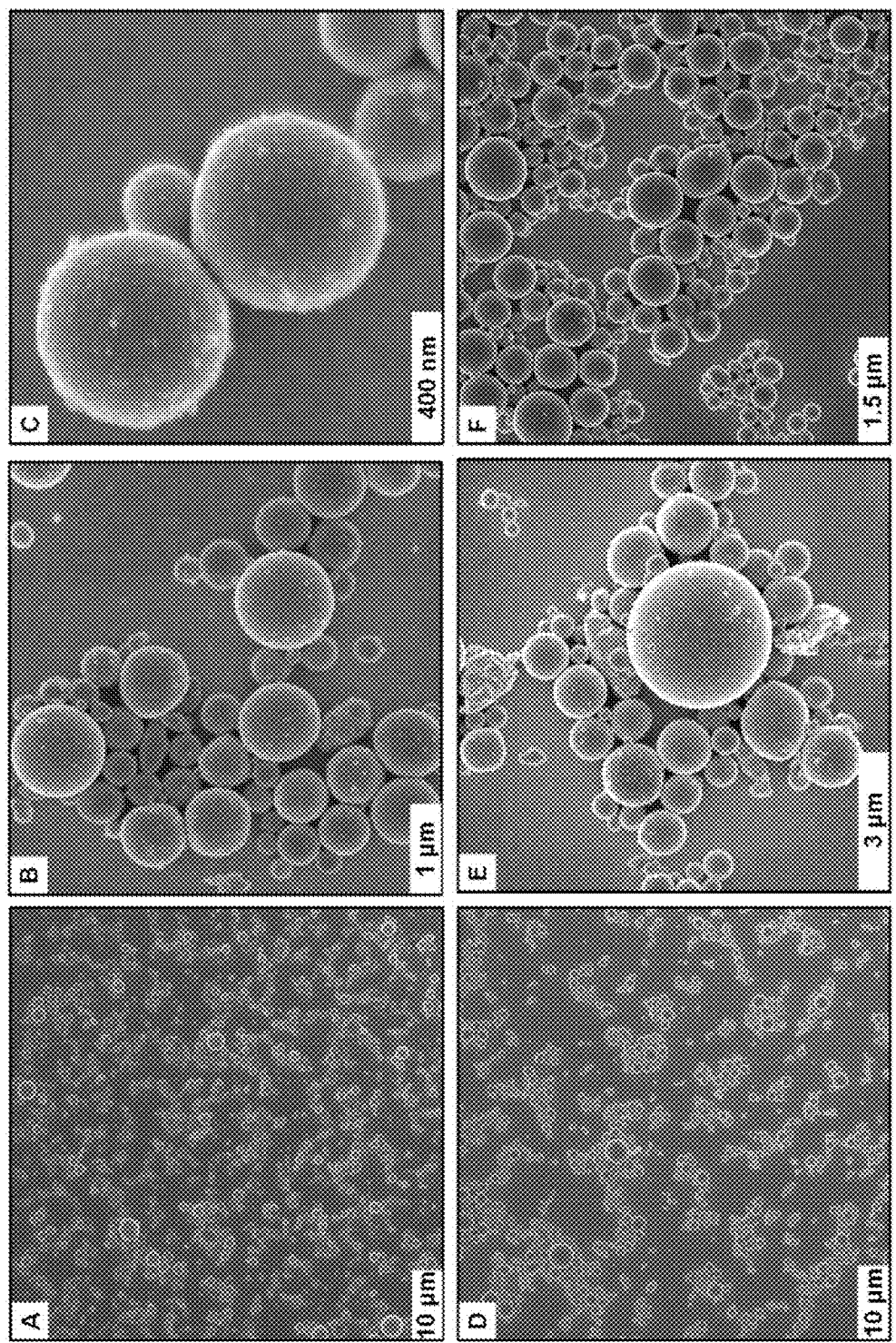
FIGS. 4A to 4F provide scanning electron micrographs of micron-scale slurry particles capped with: A-C) 1ATC9 and D-F) C12 in accordance with embodiments, imaged at a variety of scales.

The violence of sonochemical techniques affects observed particle morphology, and tends to cause dispersed particles to deviate from the expected spheres as a function of sonication time. For example, exposure to long-duration ultrasonic cavitation has been shown to cause chemical reactions, and eventually degrades EGaIn nanomaterials. (See, e.g., J. W. Chen, W. M. Kalback, Ind. Eng. Chem. Fund. 6, 175 (1967), the disclosure of which is incorporated herein by reference.) In the presence of a SAM, alloy nanoparticles can retain their spherical shape longer before succumbing to this damage. For example, the presence of alkanethiolate capping layers mitigates the morphological damage at the micro- and nanoscales. FIG. 3 shows additional detail of the sonochemical product of EGaIn and ethanol in the absence of alkanethiol ligands. In particular, this images shows that sonicating EGaIn in ethanol in the absence of alkanethiol ligands will disperse the alloy, but particles are irregular and are unstable due to oxidation. Spherical particles form, but rapidly degrade as oxide forms and separates from the alloy during sonication.

Figure 5:
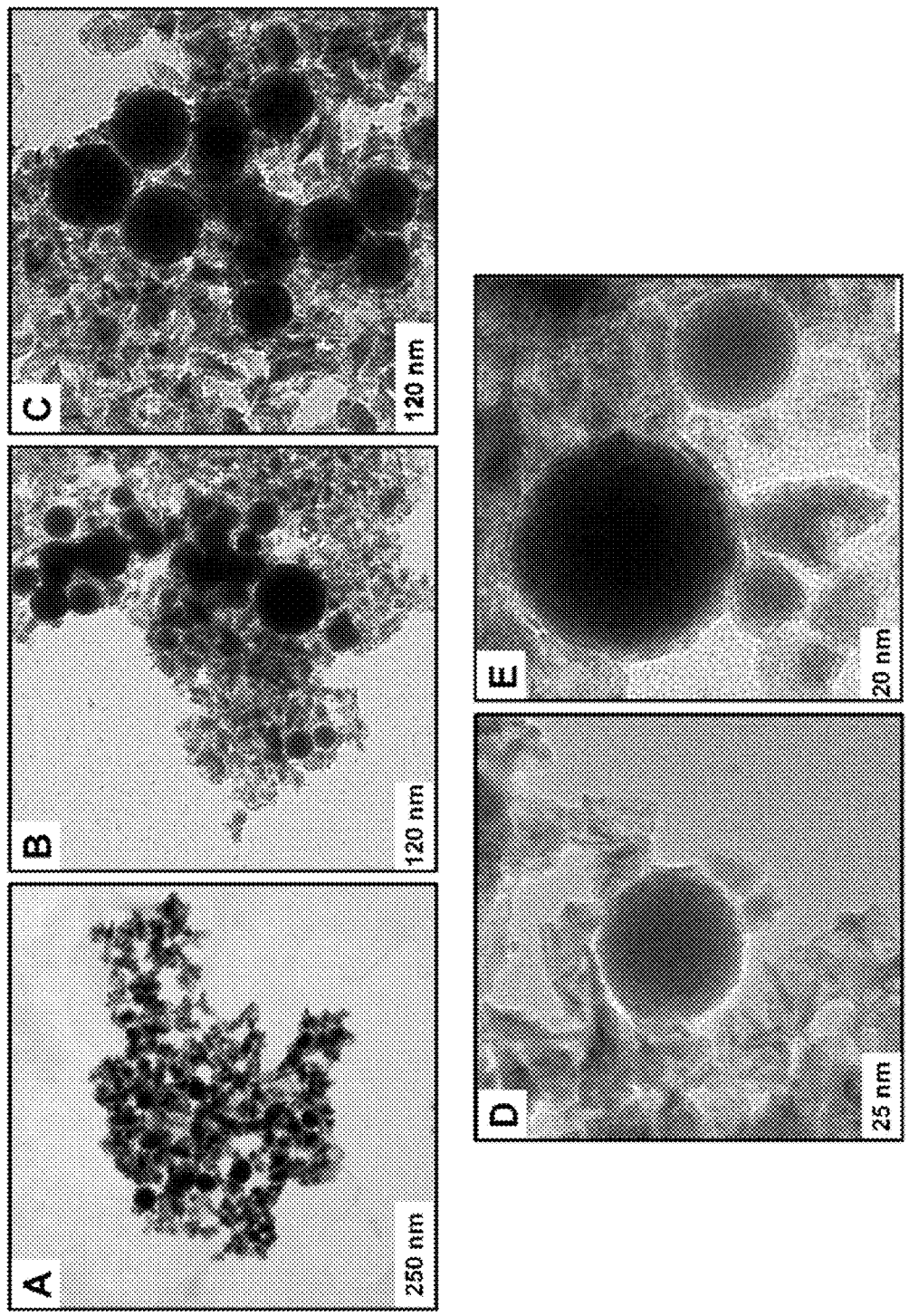
FIGS. 5A to 5E provide transmission electron micrographs (TEM) of purified, as-synthesized 1ATC9-capped nanoparticles in accordance with embodiments at a variety of size scales, here with 2 h sonication time.
Figure 6:
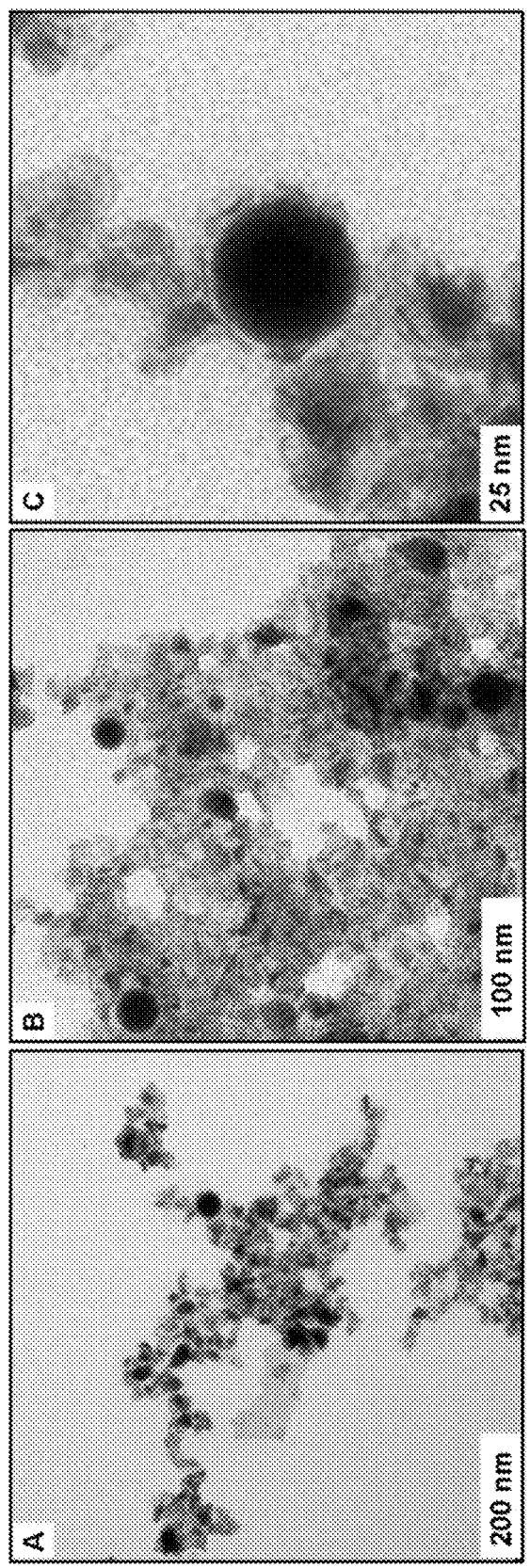
FIGS. 6A to 6C provide transmission electron micrographs of purified, as-synthesized C12-capped nanoparticles in accordance with embodiments at a variety of size scales, here with 2 h sonication time.

In contrast, FIGS. 4A to 4F depict SEM images of the uniformity for all SAM-capped particles at the microscale (at different magnifications). There are numerous spherical particles, as well as irregular particles. It is straightforward to separate the typically larger, spherical particles by centrifugation. As shown, most particles are spherical, but some particles deform (presumably due to oxidation at the interface). No systematic differences between capping ligands are observed at this scale. In FIGS. 5 and 6, TEM images synthesized (filtered and purified) 1ATC9- and C12-capped nanoparticles, in accordance with embodiments are shown, respectively. As shown, in FIGS. 5A to 5E, for the 1ATC9-NPs, there are numerous spherical particles surrounded by irregular fragments. Irregular particles range in size from 5-20 nm and appear as defined particles. In contrast, in FIGS. 6A to 6C, for the C12-NPs there are few spherical particles and the irregular material does not appear well-defined. As discussed above, the difference arises from the difference in SAM ligands. As the C12 film does not actively assist scission, nanoparticle production is slow, and C12NPs are eventually fragmented. In contrast, the 1ATC9 monolayer assists scission, improving yield by decreasing the time necessary to obtain nanoparticles.

Accordingly, in many embodiments, the ultrasound frequency and intensity is adjusted to maximize nanoparticle formation and control nanoparticle size, while minimizing chemical damage to the alloy, regent and self assembly monolayers.

EXEMPLARY EMBODIMENTS

Methods and Materials

1-Dodecanethiol (C12), gallium-indium eutectic (EGaIn), polyvinylpyrrolidinone (powder, average molecular weight ~55,000), 3-mercapto-N-propionamide (1ATC9), and 200 proof (undenatured) ethanol were purchased from Sigma Aldrich. Ethanol (200 proof) was degassed by six freeze-pump-thaw cycles (frozen in liquid nitrogen, pumped to $10^{-3}$ Torr, then allowed to thaw in a lukewarm water bath) in an airfree flask (Chemglass (part number AF 0522), Vineland, N.J.). The degassed solvent was transferred to a nitrogen-filled glovebox for storage and subsequent sample preparation. 1 mM solutions of 1ATC9 or (C12) are prepared and stored inside the glovebox environment, but are generally removed immediately prior to nanoparticle synthesis. Although specific reagents are described, it should be understood that this method can be used with common laboratory equipment and commercially available solvents (ethanol) and fine chemicals (1-mercapto-N-nonylpropionamide). In addition, although particular volumes of reagents are described, it should be understood that the method is scalable to preparative quantities.

Nanoparticle Preparation

For ease of transfer, measurement, and to minimize waste, the liquid EGaIn alloy is drawn into a plastic 1 mL syringe, and capped immediately after use to prevent oxidation. A small quantity (~0.18 g) is deposited into a 1.5 mL conical plastic centrifuge tube. The appropriate ethanolic solution is then added, to a volume of 0.75 mL. The tubes are then sealed and placed in a capped, secondary containment vial (to prevent contamination of the ultrasonic bath in the event of a leak, and as a safety precaution due to the flammability of ethanol), which are half-filled with water. The samples are suspended in an ultrasonic bath for two hours. If the samples are prepared entirely in a nitrogen environment, it is critical to allow atmospheric air to fill the headspace of the vial, or the ultrasonic bath will be unable to disperse the alloy. Vial shape is also important to the interaction of the ultrasound with the sample. We have observed failures if the vial is overfilled with solution. Turning the vial on its side (increasing the surface area of the liquid) will typically solve problems associated with low yield. For particles produced using PVP, the solution for EGaIn dispersal was prepared by dissolving 40-50 mg in 1.25 ethanol, and were treated with ultrasound for 100 min. After ultrasonic treatment, the solution should appear opaque, and deep gray. Held upright, the largest alloy particles will sediment within several seconds. The remaining solution is drawn into a plastic needleless syringe. An Anotop 10 syringe filter (0.1 µm pore size) manufactured by Whatman (Piscataway, N.J.) is fitted to a syringe, and the solution pressed through. If large particles must be retrieved, brief centrifugation will liberate the nanoscale component from the microscale. After decanting, the microscale component can then be resuspended in ethanol and filtered or purified. The nanoscale component is sedimented by centrifugation and redispersed in neat ethanol three times to remove remaining thiols from solution.

Characterization

Specimens for transmission electron microscopy (TEM) were prepared by drop casting 0.20 µL of purified EGaIn nanoparticles suspended in ethanol onto 200 mesh formvar/copper grids purchased from Ted Pella, Inc. (Redding, Calif.). Solutions were allowed to rest for four minutes, and then remaining solution was removed by wicking. Micrographs were recorded using either a FEI/Philips CM120, typically with an accelerating voltage of 120 kV, or a TITAN S/TEM (FEI) at an accelerating voltage of 300 kV. The TITAN is also equipped with an X-ray diffractometer. Diffraction patterns were collected with accelerating voltages between 80 and 300 kV to assess whether the beam energy played a role in particle phase changes.

Specimens for scanning electron microscopy (SEM) were prepared by deposition of purified particles onto a gold substrate (prepared by electron beam evaporation of 100 nm of gold onto a silicon wafer, on top of a 10-nm-thick chromium adhesion layer). Secondary electron images were collected on a JEOL 7500 Cold Field Emission SEM, typically at an accelerating voltage of 3.0 kV and a working distance of 4.4 mm.

Transmission infrared spectra were collected on a Nicolet 8700, manufactured by ThermoFisher Scientific. Purified EGaIn nanoparticles suspended in ethanol were diluted to matching color density and then dropcast on a KBr disk. After ethanol evaporation, the sample was placed in the sample compartment. Reported spectra represent 2400 scans at 4 $cm^{-1}$ resolution. A background spectrum was obtained using a clean KBr disk with identical instrument settings. Dropcasting from a nanoparticle suspension in perdeuterated methanol (Cambridge Isotopes, Andover, Mass.) did not alter the observed intensity in between 2800 and 3000 $cm^{-1}$.

UV-Visible spectra were obtained using an Evolution 600 UV-Vis spectrometer equipped with deuterium and xenon lamps, manufactured by ThermoFisher Scientific. All spectra were collected between 190 and 900 nm, switching between the deuterium and xenon sources at 325 nm. Quartz cuvettes with a 1 cm path-length were purchased from Sigma Aldrich (part number Z276928). Nanoparticles were purified and diluted to the same color density, and 200 proof ethanol was used as a reference sample. A 100% transmittance baseline was obtained using 200 proof ethanol prior to data collection. Spectra for nanoparticles were normalized to 1 absorbance unit, and the spectrum for 1ATC9 was normalized to 2 absorbance units for visual clarity.

Formation and Characterization of EGaIn Nanoparticles

FIGS. 7A to 7D illustrate embodiments of a synthetic process used for forming gallium based nanoparticles with photographs, SEM, and TEM images of the reaction products. As shown in the figures, in these embodiments a quantity of EGaIn is placed into solution with a self-assembly molecule, such as a thiolate. For example, in the experiments summarized in FIGS. 7A to 7D, EGaIn is placed into solution with ethanolic thiol (C12 or 1ATC9). For comparison, neat ethanol is used as a control. Air is allowed to fill the headspace of the vial, and the vessel is placed in an ultrasonic bath to undergo sonication.

In the experiment, the solution is sonicated for two hours. As the alloy gradually disperses, an opaque, grey slurry is produced (FIG. 7A). Both molecules deposit rapidly at the EGaIn interface as the liquid alloy is dispersed. Indeed, after sonication the largest particles precipitate within seconds, and the slurry is removed from the vial. If separation of components is desired then in embodiments the larger slurry components may be separated by filtration through a filter (for example, >100 nm components may be separated by a 0.1 µm Whatman Luer Lock membrane filter leaving sub-100-nm particles). Alternatively, the components may be separated by mild centrifugation for subsequent characterized by SEM. A solution containing nanoparticles is transparent and reddish brown. In other embodiments, particles may be purified by centrifugation and removal of the supernatant, followed by redispersal of the particles in solution (such as in neat ethanol). Repeated centrifugation, decanting, and redispersal in ethanol may also be used to eliminate excess 1ATC9 reagent.

Using this method, embodiments of eutectic gallium-indium liquid alloy microscale and nanoparticles were dispersed in ethanol, C12 and 1ATC9 for comparison (see FIGS. 8A to 8F). EGaIn dispersed in neat ethanol without a SAM ligand of any type results in spheroid, rippled particles; the surface oxidizes in the absence of stabilizing, capping thiol ligands. Indeed, as shown in FIG. 8A, when simply dispersed in neat ethanol (without SAM ligands such as thiols) the EGaIn slurry is composed of micron-scale particles that are generally oblong or deformed spheres or spheroids, surrounded by oxidized alloy. Increasing the magnification to examine the nanoscale fraction (FIG. 8B) shows that it is characterized by disordered, degraded, and discontinuous material, and that the particle surface is reminiscent of the rippled appearance of the bulk alloy in air. Accordingly, while dispersing EGaIn in neat ethanol (without thiols) gives a deep brown solution that can be mistaken for nanoparticles; analysis shows only sparse discrete particles.

However, as seen in FIGS. 8C and 8E, the liquid nanoparticles formed during ultrasound in the presence of either 1ATC9 or C12 are well-formed and predominantly spherical, with little degraded material; the alloy surface is stabilized and protected by the presence of the self-assembled monolayers. In addition, it is demonstrated that continued ultrasonic treatment decreases particle size to the nanoscale, with SAM deposition protecting the alloy against oxidation. As with the slurry particles, the SAM-protected, spherical EGaIn nanoparticles are formed in a continuous size series.

Both 1ATC9NP and C12NP have similar general morphologies but differ in relative yields. To examine the relative yield, C12NP and 1ATC9NP are isolated and concentrated by fractional centrifugation. This fractional centrifugation operates to separate and to concentrate larger spherical nanoparticles for TEM analysis (FIGS. 8D and 8F). As shown in FIG. 8D C12NP are produced in low yield, and in some instances cuboid particles are observed (arrow). In contrast, as shown in FIG. 8F, 1ATC9NPs are produced in higher yield, confirming the difference in nanoparticle yield when using SAMs with intermolecular interactions capable of inducing strain. High-resolution images of the thiol-protected spherical nanoparticles (FIGS. 8D & 8F) reveal no crystalline lattice, which would typically be observed for solid metallic nanocrystalline nanoparticle systems. Meanwhile, X-ray diffraction reveals only a ring, consistent with the metal of the alloy nanoparticles in the liquid or amorphous glass phase (FIG. 8F, inset), despite the cryogenic temperature of the TEMA representative.

These observations affirm that the formation, structure, and dynamics of the SAM play an active role in the mechanism of EGaIn nanoparticle formation. Sonication is certainly responsible for inducing the majority of particle division. However, as substantially higher yields of spherical nanoparticles are observed when formed in the presence of 1ATC9, it follows that the functional amide stratum more effectively assists particle division than C12.

Figure 9:
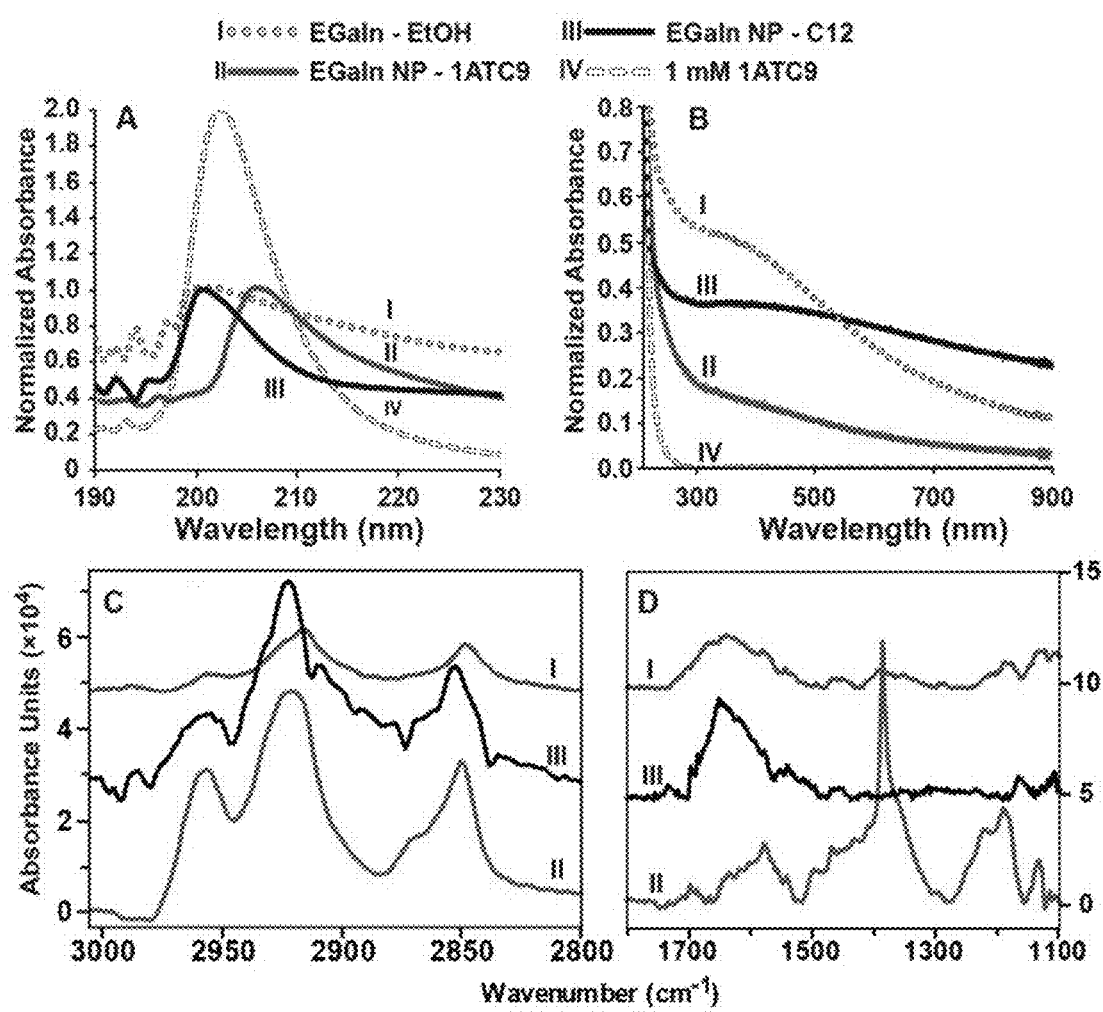
FIGS. 9A to 9D provide data plots of: A & B) normalized UV-Visible absorption, and C & D) transmission FT-IR spectra for colloidal EGaIn nanomaterials.

Short-wavelength UV-visible spectra reveal strong absorption consistent with the surface plasmon resonance of gallium. In particular, the EGaIn nanoscale component exhibits strong absorption in the ultraviolet (UV), with more moderate extinction throughout the rest of the UV-visible spectrum (FIGS. 9A and 9B). The characteristic gallium plasmon resonance is centered at 202 nm for C12NP, and 207 nm for 1ATC9NP, consistent with the measurements for gallium colloids produced by chemical liquid deposition. (For reference, the $\pi$-$\pi$* transition for the 1ATC9 amide is centered at 204 nm.) The redshift observed for 1ATC9NP is attributed to the difference of the ligand shells, though a size effect cannot be discounted because of the observed polydispersity. (See, e.g., P. Kalimuthu & S. A. John, *Mater. Chem. Phys.* 122, 380 (2010); S. K. Ghosh, et al., *J. Phys. Chem. B* 108, 13963 (2004); and K. P. Rice, et al., *J. Phys. Chem. C* 115, 1793 (2011), the disclosures of which are incorporated herein by reference.)

The SAM-capped particles absorb less efficiently at higher wavelength. Infrared spectra of the EGaIn NPs in FIGS. 7C and 7D indicate the presence of methyl and methylene stretches are observed, consistent with the presence of SAMs 1ATC9 or C12 monolayers on eutectic alloy nanoparticles. Particles are purified, diluted with ethanol to similar optical density, and are dropcast on KBr crystals. The SAM-capped particles exhibit strong absorptions from the alkyl chain methyl and methylene stretches between 3000 and 2800 cm$^{-1}$; the signature for the EtOH-capped material is substantially weak. Between 1800 and 1100 cm$^{-1}$, a broad absorption centered around 1600 cm$^{-1}$ is characteristic of all dispersed EGaIn alloy forms, notably weaker for 1ATC9NP. The amide group has several strong absorptions in this region. Strong absorptions are centered at 1200 and 1385 cm$^{-1}$, with an interfering band at 1580 cm$^{-1}$. These bands are indicative of amide groups of the assembled 1ATC9 monolayers, and are not observed in the other materials.

CONCLUSION

In embodiments, molecular self-assembly guides the direct formation of liquid alloy nanoparticles, and strongly influences particle size, yield, morphology, and metal plasmon resonance. In some embodiments, the dispersed alloy particles are stabilized by thiolate monolayers, remain in the liquid state, and are nearly perfect spheres. The embodiments of synthetic routes detailed here are easily accessible and have a low environmental impact.

Microscale eutectic or amorphous metallic glass domains that form within metal alloys are responsible for the microscale structure and macroscale properties of many commercial alloys. (See, e.g., W. J. Boettinger, et al., *Annu. Rev. Mater. Res.* 32, 163 (2002); and E. Khajeh & D. Maijer, *Metall. Mater. Trans. A* 42, 158 (2010), the disclosures of which are incorporated herein by reference. Micro- and nanoscale uniform alloy particles may be designed then incorporated into an alloy to exert control over the structure and properties of materials in a way natural solidification may not allow. Further, by designing new molecules for self-assembly, it is possible to incorporate different functionality and interaction strengths in the film while guiding and controlling nanoparticle size and shape. As adsorbed molecules interact both structurally and electronically with the nanoparticles, there are now routes to exotic designer materials. This combination of simple preparation, adjustable alloy composition, and direction by self-assembly lends limitless potential for the design of new metallic, semiconductor, and organic hybrid materials and devices based on liquid metal alloys. Molecular design can also be employed to alter the morphology of the particles and interact electronically with the material for solar or catalytic applications. Particles will be incorporated into metallurgical alloys to attempt to control the microscale structure of metals like aluminum, steel, or bulk metallic glass. These particles may also be used potentially for nanoscale gallium indium arsenide materials, considered a next-generation semiconductor candidate material.

DOCTRINE OF EQUIVALENTS

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A method of forming liquid-phase metal alloy nanoparticles comprising:
   providing a liquid phase metal alloy material having at least two separate alloying components;
   placing the liquid phase metal alloy material into solution with an organic self-assembly molecule, the self-assembly molecule having a first end having a functional group covalently reactive with the liquid phase metal alloy and a second end having one or more functional groups capable of exerting a directional intermolecular bonding interaction with adjacent self-assembly molecules, the directional intermolecular bonding interaction being selected from the group consisting of: hydrogen bonding, coordination chemistry and covalent bonding;
   dispersing the liquid phase metal alloy material through the solution by application of ultrasonic treatment such that self-assembly molecules adsorb with the liquid phase metal alloy material;
   assembling the liquid phase metal alloy material into nanoparticles of liquid phase metal alloy material via self-assembly of the self-assembly molecules such that a monolayer shell of self-assembly molecules is formed about each of the nanoparticles of liquid phase metal alloy material wherein the first end of each of the self-assembly molecules is covalently bound to the outer surface of the nanoparticle and wherein the second end of each of the self-assembly molecules extends outward from the nanoparticle and interacts with the second ends of adjacent self-assembly molecules in the monolayer shell through the directional intermolecular bonding interaction; and wherein the directional intermolecular bonding interactions between the adjacent self-assembly molecules of the monolayer shell induce surface strain in the underlying alloy nanoparticle such that the nanoparticle is comprised of a plurality of scissionable domains, each scissionable domain being defined by the presence of local order between the self-assembly molecules.

2. The method of claim 1, further comprising ultrasonically treating the nanoparticles to further reduce the size of the nanoparticles.

3. The method of claim 1, wherein an outer surface of the liquid phase metal alloy is passivated.

4. The method of claim 3, wherein the passivation comprises oxidizing the outer surface of the alloy material.

5. The method of claim 1, wherein the liquid phase metal alloy is an EGaIn material.

6. The method of claim 5, wherein the EGaIn material is further doped with at least one additional alloying material.

7. The method of claim 6, wherein the at least one additional alloying material is selected from the group consisting of the noble metals, arsenic, iron, copper, chrome and combinations thereof.

8. The method of claim 6, wherein the at least one additional alloying material is a photoactive material.

9. The method of claim 1, wherein the self-assembly molecule exerts the directional intermolecular bonding interaction through one of either coordination chemistry or direct covalent bonding.

10. The method of claim 1, wherein the self-assembly molecule has a second end comprising one of the following functional groups: carboxylic groups, metal and nonmetal functional groups, and azide and alkyne functional groups.

11. The method of claim 1, wherein the self-assembly molecule has a thiol at its first end.

12. The method of claim 1, wherein the self-assembly molecule is 3-mercapto-N-propionamide.

13. The method of claim 1, further comprising purifying the nanoparticles via centrifugation.

14. The method of claim 1, wherein the nanoparticles are spheroids.

* * * * *